Figure 1:
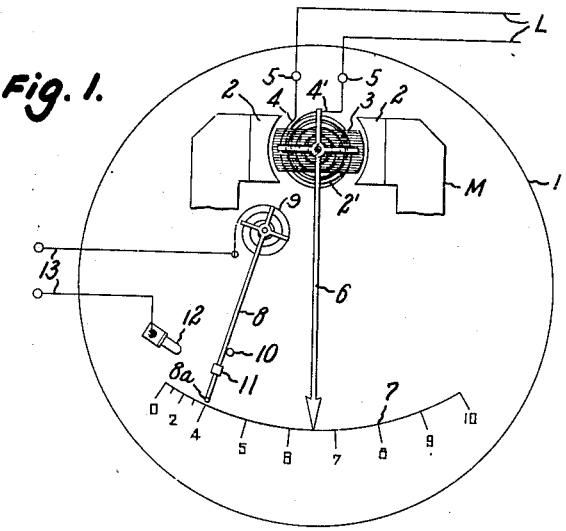

Nov. 3, 1953

E. M. EADIE, JR 2,658,179

ELECTRICAL MEASURING INSTRUMENT

Filed June 1, 1949

Edward M. Eadie Jr.
INVENTOR.

BY Pierce, Scheffler & Parker
Attorneys

Patented Nov. 3, 1953

2,658,179

UNITED STATES PATENT OFFICE 2,658,179

ELECTRICAL MEASURING INSTRUMENT

Edward M. Eadie, Jr., Westfield, N. J., assignor to Weston Electrical Instrument Corporation, Newark, N. J., a corporation of New Jersey Application June 1, 1949, Serial No. 96,537

1 Claim. (Cl. 324—132)

The present invention relates to electrical measuring instruments and in particular to instruments of the type having a moving system that includes a coil, or soft iron vane, or the like that is deflected about its axis in accordance with the amplitude of the current to be measured. The moving system also includes a pointer and associated scale where it is desired to indicate the amplitude of the current, or the scale may be eliminated if the instrument is to be used only as a relay in which case contact means are included and so arranged as to close or open when the coil reaches a preselected angular position.

An object of the invention is to provide for a modification of the normal angular deflection characteristic of the moving system of an electrical measuring or relay instrument over a selected portion or portions of the displacement range of the system.

Another object is to provide an improved construction for electrical measuring instruments which permits the scale to be expanded so as to afford greater reading accuracy over a particularly desired band of pointer deflection between the zero and maximum current points on the scale.

Another object is to provide an improved electrical measuring instrument which features expanded scale indications in both the low and high ranges of the current to be measured.

Another object is to provide an improved instrument type relay in which the movable contact member is carried by an auxiliary arm that is actuated by the pointer element of the moving system rather than by the pointer itself as is the present practice. The new construction is especially advantageous when the relay contacts are of the magnetic type since it leaves the pointer free to move in the opposite direction after the contacts are closed to thereby indicate the changing nature of the measured current. Also when two such auxiliary arms and associated contact sets are used to obtain contact closure at two different values of instrument current, the respective circuits associated with the two sets of contacts can be mutually electrically isolated.

Another object is to provide a measuring instrument having a deflectable pointer member and which further includes an auxiliary arm disposed in the path of movement of the pointer and spring loaded in such manner as to modify the normal deflecting characteristic of the pointer after the latter has picked up the auxiliary arm.

Figure 2:
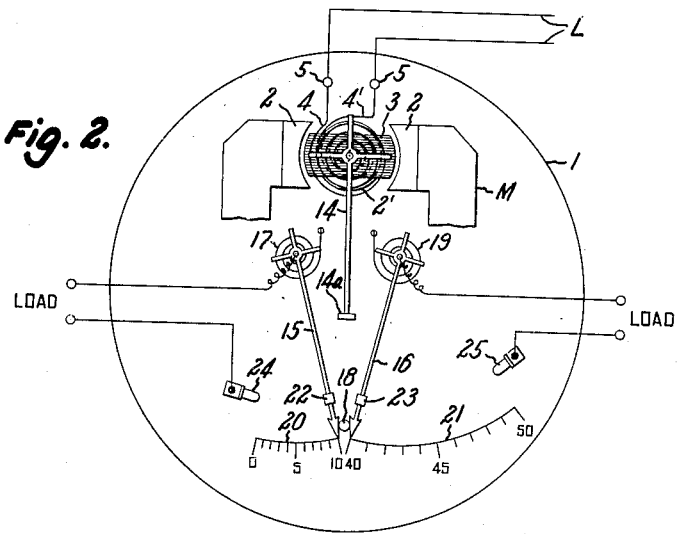

The above stated and other objects and advantages of the invention will become apparent from the following description and accompanying drawings in which:

Fig. 1 is a semidiagrammatic illustration of one type of instrument embodying the invention, this particular instrument being arranged to serve both as a "low current" relay and current indicator; and Fig. 2 is a similar view illustrating a somewhat modified construction featuring two sets of relay contacts which provide relay operation at predetermined low and high current values, and also current indicating means limited to the low and high current ranges.

Referring now to Fig. 1, the combined relay and indicator instrument is comprised of a casing 1 within which is disposed a magnetic system including a C-shaped permanent magnet M with soft iron pole pieces 2—2, and a cylindrical core 2' in the gap between and radially spaced from the pole pieces. A moving coil 3 is supported by conventional jewel bearings, not shown, for angular displacement about the core axis, and upper and lower control springs 4, 4' respectively have the customary dual functions of restoring the moving system to a preselected angular position in the absence of current through the coil and of serving as flexible current-carrying leads for the coil. Appropriate terminals 5—5 are provided for receiving the leads L from the circuit network or device which establish a current of varying magnitude through the coil. An arm or pointer 6 is secured to the coil 3 and is moved thereby along a graduated scale 7.

The parts so far described may be of any conventional design and construction, and the coil current-angular deflection characteristic of the moving system depends upon the magnetic flux distribution along the air gaps. For simplicity of explanation, it is assumed that the deflection characteristic so long as the torque developed by current flowing in the coil is opposed only by the torque of control springs 4, 4'.

In accordance with the invention, the current-deflection characteristic of the instrument is altered over a portion of the measuring range by mechanism which introduces an additional torque which, according to the desired characteristic, may supplement or may act in opposition to the torque of the control springs 4, 4'.

As shown schematically in Fig. 1, the additional mechanism introduces a torque which must be overcome by the springs 4, 4' to effect displacement of the pointer 6 toward zero scale position when a decreasing coil current drops below a preselected value. An auxiliary arm 8 is pivotally supported by jewel bearings, not shown, and biased counterclockwise by a control spring 9 to seat against a stop 10 which is so positioned that the up-turned end 8a of the auxiliary arm is contacted by pointer 6 when the coil current drops to the preselected value "4" on the illustrated "0-10" scale of graduations. It will be evident that a further unit decrease in coil current will not result in the unit displacement of the moving system which was effected in the current range above the current value "4," since the auxiliary arm 8 must now be displaced against the bias or torque of its control spring 9. The scale is thereby condensed at its lower end and correspondingly expanded at its upper end. The "0-10" scale 7, as shown in Fig. 1, is typical of the invention and illustrative of a particular "0-10" scale instrument in which the auxiliary arm 8 is picked up by the pointer system at a current value of "4," and has a control spring 9 of effectively five times the strength of the control springs 4, 4', with respect to displacement of the moving system of the instrument. Other ranges of scale condensation and scale expansion may of course be obtained by varying the scale position at which the auxiliary arm 8 is engaged by the pointer 6, and by varying the ratio of the torques of springs 4, 4' and spring 9.

The instrument shown in Fig. 1 can also serve as a "low" current instrument relay and for such purpose the auxiliary arm 8 carries a contact 11 for engagement with a stationary contact 12 to close a circuit through the load terminals 13 when arm 8 is displaced by pointer 6 to a position corresponding to the value of coil current for which it is desired to have the relay operate.

The contacts 11, 12 may be of conventional type or may be magnetic contacts, the contact 11 on arm 8 being a soft iron rider and the stationary contact 12 being a small permanent magnet. If magnetic contacts are employed, the pointer 6 is of course free to move up scale to indicate the instantaneous current value whether or not the contact 11 on arm 8 is magnetically held in engagement with the magnet contact 12. Apparatus for resetting magnetic contacts must of course be provided but the details of the resetting apparatus form no part of the present invention. The resetting may be effected manually or automatically as indicated, for example, in prior Patents 2,014,388 and 2,062,915 respectively.

Should it be desired to read the lower half of the scale with the higher degree of accuracy, the auxiliary arm 8 and stop 10 would of course be shifted from the left to the right side of the pointer 6 and the loading on the arm changed from counterclockwise to clockwise.

It will also be evident that the scale may be omitted if the instrument is to be used only as a relay, and conversely the contacts may be omitted if the instrument is to be used solely for indicating purposes.

In an alternative construction, as illustrated in Fig. 2, the arrangement of the coil 3, pole pieces 2—2 and control springs 4, 4' is the same as in Fig. 1 and the coil 3 is deflected in a counterclockwise direction as the coil current increases. However, instead of the pointer 6, a pusher arm 14 and two pivotally mounted auxiliary arms 15 and 16 are used to provide an expansion of the scale at both the lower and high ends of the measuring range, to suppress an intermediate portion of the measuring scale and, if desired, to provide relay operation at preselected low and high values of the coil current.

The lower end of auxiliary arm 15 is fashioned as a pointer which is urged in a counterclockwise direction by a control spring 17 to seat against a stop pin 18, and the lower end of arm 16 is similarly urged in a clockwise direction by a control spring 19 to seat against the same stop 18. A scale 20 graduated from "0-10" is associated with pointer arm 15, and a second scale 21 graduated from "40-50" is associated with pointer arm 16. Pointer arms 15 and 16 can be located in the plane of movement of pusher arm 14 and the latter is provided with a lateral projection 14a at its free end for picking up pointer arm 15 when the coil current is decreasing and reaches a value corresponding to the "10" mark on scale 20, and, in a similar manner, pusher arm 14 will engage and pick up pointer arm 16 when the coil current is increasing and reaches a value corresponding to the "40" mark on scale 21.

As in the arrangement disclosed in Fig. 1, when the current in coil 3 decreases to a value of "10" on scale 20, pusher arm 14 will engage pointer arm 15 but its displacement characteristic thereafter per unit change in decreasing coil current will be modified by the torque applied to the arm 15 by control spring 17. In a similar manner, the displacement characteristic of pusher arm 14 after engaging the other pointer arm 16 will be modified by the torque applied to arm 16 by control spring 19. The modifying forces applied by the arms 15, 16 if of like magnitude will result in like expansions of the lower and upper ends of current scales. If, however, as shown in the drawing, a higher degree of reading accuracy is desired for the upper current range, the torque applied to pointer arm 16 by spring 19 can be greater than applied to pointer arm 15 by spring 17. The net effect of the indicator disclosed in Fig. 2 is to expand the scale indications at both the lower and upper ranges of coil current so that substantially the entire length available for the graduated scale can indicate variations in coil current from "0 to 10" and "40 to 50," or such other ranges as may be desired. With the usual arrangement of a single pointer rotated by the moving coil, and a single "0 to 50" scale having a length substantially equal to the combined lengths of the two scales 20, 21, it is quite obvious that without the deflection modifying means of the present invention, the scale graduations would be of much smaller width and hence could not be read as accurately at the critical high and low current ranges.

The instrument in Fig. 2 can also serve as a relay for closing load circuits at preselected low and high values of coil current by providing contacts 22, 23 on the pointer arms 15 and 16 respectively for cooperation with stationary contacts 24, 25. As with the construction shown in Fig. 1, these sets of contacts may be of the magnetic type, in which case a reset device would then be included to separate the contacts.

Instrument relays embodying the invention have several advantages over the prior relay constructions in addition to the basic advantage of scale expansion and scale suppression. The pointer 6 or pusher arm 14 does not carry the load current, and therefore the magnitude of the load current imposes no design restrictions upon the moving coil system. Complete electrical isolation between the "low" and "high" contact relay circuits of Fig. 2 is obtained for the same reason. The separation of the contacting function from the measuring or indicating function is of special advantage in the case of relays with magnetic contacts since the pointer is free to move to indicate the changing magnitude of the current in the control circuit in those cases in which the magnetic contacts must remain closed for some time after an initial engagement. Simple self-resetting relays of magnetic contact type are possible with a single relay as a solenoid reset device for each set of the contacts of the Fig. 2 relay may be energized by the closure of the other set of contacts.

Some reduction in the height of relay housings is possible when the load circuit must be isolated from the measuring circuit. A conventional relay of this type would require three spiral springs, each insulated from the others, and arranged axially with respect to moving system axis. This additional height is avoided with the new relays as the bearings for supporting the contact arm or arms need not extend above, and may well be below, the level of the upper bearing of a moving system having only two spiral springs.

In conclusion it will be appreciated that the instruments herein described are but typical of the many indicating or relay arrangements which are possible within the spirit and scope of the present invention. The illustrated electrical instruments or relays are of the permanent magnet-moving coil type but it will be apparent that the invention may be incorporated in measuring or relay instruments of known alternating current or dynamometer types. The ranges of scale expansion or scale suppression may be varied at will over wide ranges according to the particular design requirements for a given instrument or relay.

I claim:

An electrical measuring instrument comprising a single graduated scale, a moving system biased to a position of rest and which includes a pivotally mounted pointer arm deflectable over said scale from said rest position in accordance with the amplitude of the electrical quantity to be measured, a second arm pivotally mounted on the same side of the instrument scale as said pointer arm, spring means biasing said second arm to a position of rest upscale from the end graduation on said scale, said second arm being in the path of deflection of said pointer arm for engagement with and displacement by said pointer arm upon reaching the rest position of said second arm thereby to thereafter modify the normal angular deflection characteristic of said pointer arm per unit change in the amplitude of the measured quantity for further pointer and scale indicated changes in said quantity in the direction of said end scale graduation.

EDWARD M. EADIE, Jr.

References Cited in the file of this patent

UNITED STATES PATENTS

| Number | Name | Date |
|--------|------|------|
| 2,110,391 | Davis | Mar. 8, 1938 |
| 2,493,060 | Daschke | Jan. 3, 1950 |
| 2,534,925 | Petzinger | Dec. 19, 1950 |

FOREIGN PATENTS

| Number | Country | Date |
|--------|---------|------|
| 9,351 of 1906 | Great Britain (Provisional specification) | Apr. 20, 1906 |
| 571,992 | Great Britain | Sept. 18, 1945 |